METHOD FOR CONTINUOUS PIGMENTATION OF POLYESTERS IN A CONTINUOUS CONDENSATION PROCESS

Filed May 12, 1969 2 Sheets-Sheet 1

WALTER BUSWEILER
HEINZ SCHATZLE
BERNHARD STOLL
INVENTORS

BY Marmorek and Bierman
ATTORNEYS

April 20, 1971 W. BUSWEILER ET AL 3,575,919

METHOD FOR CONTINUOUS PIGMENTATION OF POLYESTERS IN A CONTINUOUS CONDENSATION PROCESS

Filed May 12, 1969 2 Sheets-Sheet 2

WALTER BUSWEILER
HEINZ SCHATZLE
BERNHARD STOLL
INVENTORS.

BY Marmorek and Bierman

ATTORNEYS

United States Patent Office 3,575,919

Patented Apr. 20, 1971

3,575,919

METHOD FOR CONTINUOUS PIGMENTATION OF POLYESTERS IN A CONTINUOUS CONDENSATION PROCESS

Walter Busweiler, Hanau am Main, and Heinz Schätzle, Dornigheim am Main, Germany, and Bernhard Stoll, Domat-Ems Grisons, Switzerland, assignors to Inventa A.G. fur Forschung und Patentverwertung, Zurich, Switzerland Filed May 12, 1969, Ser. No. 823,641
Claims priority, application Switzerland, May 17, 1968, 8,622/68
Int. Cl. C08g *51/04*
U.S. Cl. 260—40 8 Claims

ABSTRACT OF THE DISCLOSURE

A method for the pigmentation of a polyester in a continuous polymerization process is disclosed. The polyester is condensed to form a stream of precondensate. The precondensate is then further condensed to form a stream of high polycondensate. A partial stream of high polycondensate is branched off from the high polycondensate stream and pigmented. The pigmented partial stream is then combined and mixed with the precondensate stream. Alternatively, the pigmented partial stream is polycondensed, then combined and mixed with the high polycondensate stream.

Figure 1:
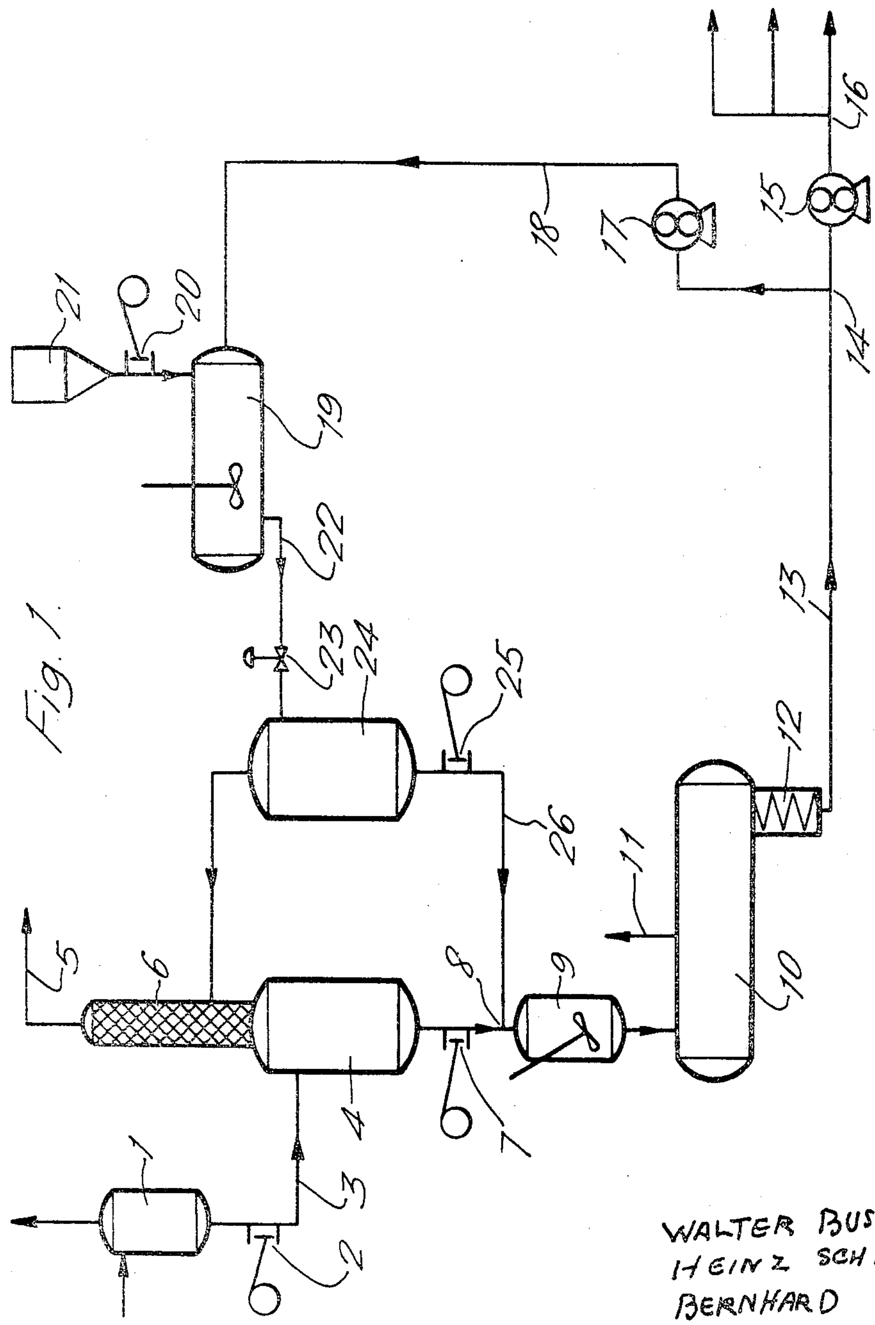

The present invention relates to a method for the continuous pigmentation of polyesters in a continuous polycondensation process.

It is known in the art (B.P. 610,137) that pigmented high-molecular polyesters can be produced by adding a glycolic dispersion of a pigment or a pigment mixture, possibly with the simultaneous addition of a dispersion aid, to a precondensate consisting of low homologs of the polycondensate, and then completing the polycondensation. The glycols that are used are those of the series $HO(CH_2)_xOH$ wherein $x$ is a number from 1 to 10. With this procedure pigments may be introduced into the melt in finely divided form and without agglomeration of the pigment particles.

It is further known that starting with diethylene glycol terephthalate or low homologs thereof, polyethylene terephthalate and copolycondensates thereof can be condensed to form high-molecular linear polycondensates, in a continuous process in the presence of suitable catalysts, such as compounds of antimony, lead or manganese. In a suitable vessel, usually designed as cascade, dimethyl terephthalate is reesterified with ethylene glycol at a temperature up to about 240° C. Any methanol formed is simultaneously distilled off. The reesterification is continued until at least 99.5% of the methylester groups present have been replaced by glycol ester groups. According to another method a mixture of terephthalic acid is reacted with ethylene glycol in a suitable reaction vessel with discharge of water. The reaction is normally conducted under pressure and at temperatures of up to about 250° C. The reaction is continued until the bis-ester of the terephthalic acid or respectively low homologs thereof have formed. The esterification or re-esterification product (degree of polymerization 1–20) is then subjected in a second stage to polycondensation.

Next, one proceeds in two or three stages, which normally operate with increasing temperature and decreasing pressure from stage to stage. In a so-called precondensation stage, a polycondensate, having a degree of polycondensation of about 20–40 is produced under a vacuum of about 40–100 mm. Hg. Thereafter, an end polycondensate having a degree of polycondensation of 100–120 is produced in one or two end reactors, at a pressure below 1 mm. Hg. The end polycondensate is supplied to the users (e.g. spinning stations) continuously.

The prior art reveals that a number of difficulties have arisen in connection with the heretofore known methods. These difficulties relate especially to the stabilization of the viscosity, the forcible formation of plug flows, and the control and regulation of the length of stay in the reactors.

Thus, for example, it is known (DAS 1,112,292) that in order to stabilize the level in the end reactor ("finisher") an exactly proportional quantity of polyester, in the granular form, must be added to the low-molecular precondensate stream. The addition of granular polyester serves to prevent level fluctuations in the end reactor. These level fluctuations occur due to irregular uptake at the after-connected users (spinning stations, granulators) and are undesirable as they lead to fluctuations in viscosity.

A simple method has now been found which permits the regulation of fluctuation in uptake by the user and the simultaneous pigmentation of the polymer.

This method for the continuous pigmentation of polyesters in a continuous polycondensation process is characterized in that a part of the stream of the end polycondensate is branched off from the total stream. The branched off part of the stream is pigmented then mixed with the remaining polycondensate. The branched off part of the end polycondensate stream is termed herein the "control stream."

The polyesters employed in the method are primarily linear polyesters, i.e. polycondensates of a bifunctional organic carboxylic acid and a diol. Examples of said bifunctional carboxylic acids include dicarboxylic acids of the aliphatic, aromatic, cycloaliphatic, or aromatic-aliphatic series, such as succinic acid, sebacic acid, isophthalic acid, terephthalic acid, naphthalene dicarboxylic acid, and p-(beta-hydroxyethoxy)-benzoic acid.

Examples of said diols include aliphatic, cycloaliphatic, aromatic or aromatic-aliphatic diols, such as ethylene, propylene, tetramethylene, hexamethylene glycols, 1,3-propendiol, or cyclohexane-dimethylol. Co-polycondensates of these bifunctional organic carboxylic acids and diols may also be used.

Polyethylene terephthalate is a preferred polyester.

The technical execution of the method of the invention is as follows. It should be noted that the below stated degrees of polycondensation refer to the production and pigmentation of polyethylene terephthalate.

A bis-diol ester of a bifunctional organic acid, notably bis-ethyleneglycol terephthalate or an oligomer thereof (in particular one having an average degree of polycondensation of 1–20, preferably 3–10) is polycondensed, in a manner known in itself, to a precondensate and immediately thereafter to a spinnable high-polycondensate ("end condensate"). From the end condensate stream a control stream (about 3–15% of the total stream) is branched off and pigmented, preferably in a reactor, with a pigment dispersion. The pigment dispersion comprises a dispersion of a pigment in the diol from which the polyester to be produced is derived. Ethylene glycol is the preferred diol. The pigmentation is carried out at relatively high temperatures, as for example 260–290° C., so that simultaneously with the pigmentation step the polycondensates are decomposed to the degree of polycondensation of the above-mentioned precondensate. The pigmented control stream is then either according to variant (a) Mixed with the remaining polycondensate stream present in the precondensation stage and subsequently polycondensed to form the spinnable high polycondensate, or according to variant (b) First polycondensed to the spinnable high polycondensate and then mixed with the remaining polycondensate stream present in the final condensation stage.

The pigment content of the dispersion with which the control stream is pigmented depends, of course, on the type of pigment and on the desired depth of color. As pigments, there enter into consideration primarily titanium dioxide, carbon black, and colored pigments. The dispersion may also contain commonly used aids, e.g. dispersing agents, etc. It is preferred that the control stream be admixed with approximately 2–40% of pigment. This is effected with pigment-ethylene-glycol dispersions of approximately 10–60%. If only a breaking of the gloss of the polyester is desired, as is done particularly with relatively small concentrations of titanium dioxide, it is better to speak of "delustering" than "pigmentation." It is preferred that 3–10% of titanium dioxide be added to the control stream so that the concentration of titanium dioxide in the total polycondensate stream is approximately 0.3 to 1%.

Variant (a) has the advantage of simplicity. Further, because the pigment-containing control stream and the main stream are readily mixable due to their low viscosities, a very uniform pigmentation is achieved. Moreover, since both streams are condensed out together, the pigmented polyesters that are obtained have very uniform properties.

Variant (b) is particularly advantageous when occasionally unpigmented polyester must also be produced. Variant (b) makes possible the admixture of a master batch polymer stream in exactly proportioned quantity. Also the quality of the pigmentation is preserved, as there is no change of medium of the pigment particles. Further, the actual condensation apparatus remains pigment free, thus greatly facilitating in a continuous operation the change-over to different pigment types.

It is readily evident that the pigmentation of the end condensate can take place only when the control stream has passed through the cycle at least once. That is, one must first "start up" the apparatus. Until this has been done, only unpigmented material is produced.

The following examples are intended to illustrated the method of the invention and not to limit same. It should be noted that the apparatus used in said examples is already "started up."

Example 1.—(Variant (a), FIG. 1)

Bis-ethyleneglycolterephthalate, having an average degree of polycondensation of 3–10, is pumped by pump 2 from a re-esterification or esterification vessel 1 through line 3 into a precondensation reactor 4. Reactor 4 is under a vacuum of 50–60 mm. Hg. and is at a temperature of 270°–280° C. The vacuum is applied via pipe 5 and column 6.

The precondensate formed in 4, has an average degree of polycondensation of 30–40, and is pumped by pump 7 to the branch 8. At branch 8 the precondensate stream converges with the control stream carrying the pigment and flowing in through line 26, the production path of which is described in the next paragraph. The now pigmented main stream then flows through the mixing vessel 9 into an end reactor 10, which is under a vacuum of less than 1 mm. Hg and at a temperature of 275°–285° C. The vacuum is applied via a bridge pipe 11. During the flow through this end reactor further condensation of the end condensate occurs; the average degree of polycondensation being 100–120. This end condensate is pumped by means of pump 12 through line 13 to the branch 14. About 90% of the end condensate is supplied to the user 16 by the proportioning pump 15.

The balance of the high polycondensate stream, i.e. the control stream (amounting to about 10% of the total high polycondensate stream) is pumped by means of proportioning pump 17 through line 18 into the glycolysis reactor 19. The glycolysis reactor should preferably be designed as a mixer. In the glycolysis reactor the stream consisting of high polycondensates is admixed with an approximately 40% glycolic titanium dioxide dispersion. The glycolic titanium dioxide dispersion is pumped by pump 20 from the storage vessel 21 to the glylcolysis reactor thereby increasing the $TiO_2$ content of the polycondensate to about 3–10% (based upon the weight of the polycondensate). Glycolysis takes place at the same time, and the degree of polycondensation drops again to 5–15, i.e., to the order of magnitude of the precondensate. This condensate, containing 3–10% of titanium oxide, flows via line 22 via the expansion valve 23 into the buffer vessel 24, which by means of the devices 5 and 6 can be maintained at the same vacuum as vessel 4. The pigment-containing condensate is pumped by pump 25 from buffer vessel 24 through line 26 to the branch 8 mentioned in the preceding paragraph.

The deliveries of pumps 17 and 20 depend on the particular level in the end reactor 10, which in turn depends upon the uptake 16. With a lower uptake the level in 10 would rise. To prevent this, the deliveries of pumps 17 and 20 are automatically increased to the desired amount, e.g. with a float-relay control; with an increase in uptake the reverse takes place. Also the deliveries of pumps 7 and 25 are adapted to each other.

Figure 2:
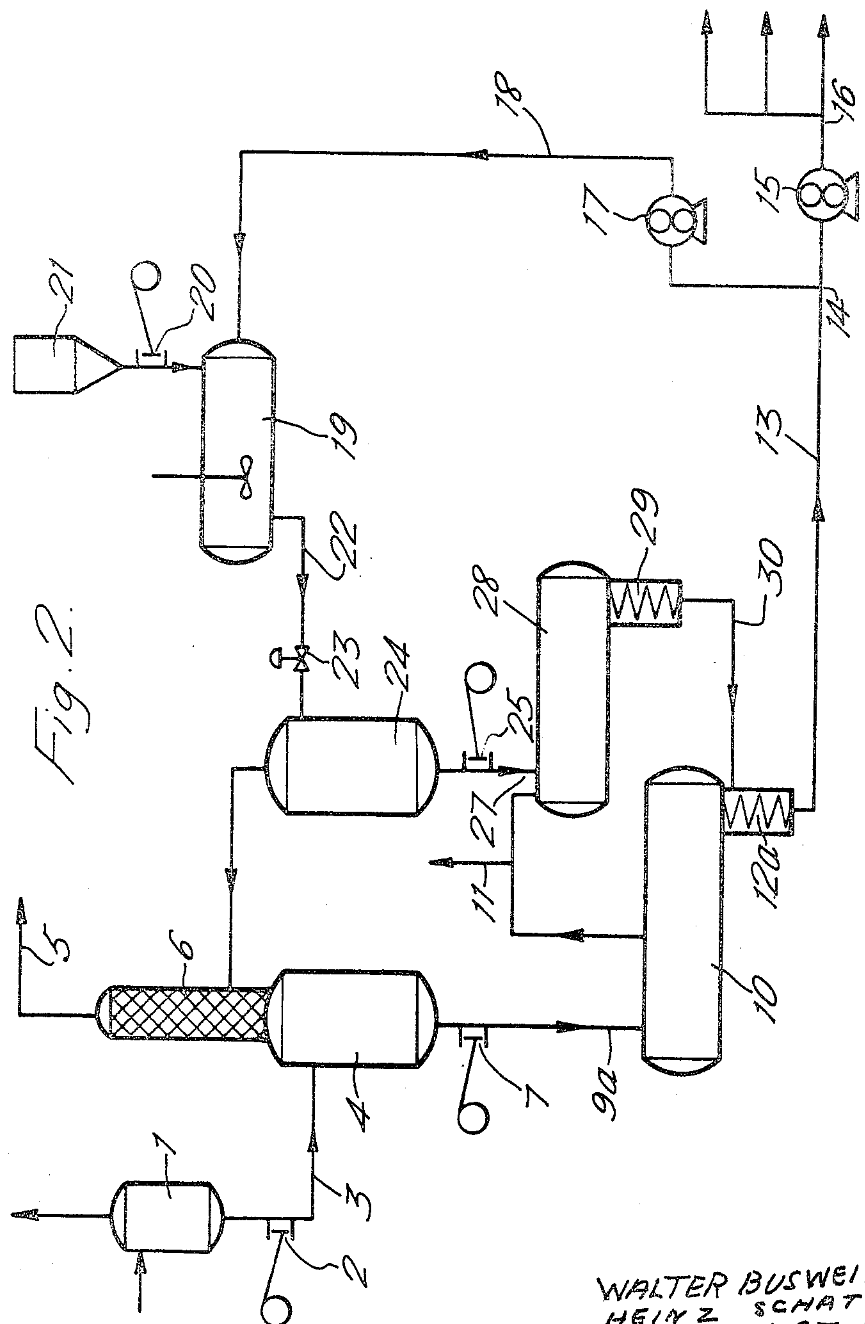

Example 2.—(Variant (b), FIG. 2)

The stream to be used for the production of polyester flows, analogously to Example 1, from 1 via 2, 3, 4, 7 and line 9*a* into the end reactor 10. In the branch at pump 12*a*, it is combined with a pigment-containing high-polymer control stream flowing out of line 30, the manner of production of which will be described in the following paragraph. The pump 12*a* is also designed as a mixer. About 90% of the polycondensate stream thus obtained goes, as described in Example 1, via 13, 14, 15, to the user 16.

The balance i.e. the control stream (about 10% of the total stream), follows the same path as in Example 1, from branch 14 via 17, 18, 19, (20, 21), 22, 23 into the buffer vessel 24. The stream is then pumped by pump 25 through line 27 into the end reactor 28, where the precondensate having a pigment content of 3–10% (as in Example 1) is high-polycondensed to the same degree of polycondensation as the polycondensate originating from the end reactor 10. Both 28 and 10 are under the same vacuum which is applied via bridge pipe 11. The pigmented control stream is proportioned by pump 29 to the main stream via line 30 into the branch at pump 12*a*, as mentioned in the preceding paragraph.

Pumps 25 and 29 depend on one another and are in turn adjusted to pump 7.

By the method of Example 1 as well as 2 one obtains beautifully and uniformly delustered polyester.

Instead of polyethylene terephthalate there can be produced and delustered in the same manner and with the same result as described in Examples 1 and 2 a co-polyester whose acid component consists 90% of terephthalic acid and 10% of p-(beta-hydroxyethoxy)-benzoic acid.

It is also possible to proportion to the partial stream, fused polyester wastes occurring at the spinning station.

The method of the instant invention offers notable advantages. For example, the uptake fluctuations at the user 16 can be equalized by the variable partial stream. Further, the degree of polycondensation of the glycolyzed and matted control stream is variable within wide limits (about 2–20), since it is subsequently brought to the desired value in the buffer vessel 24. Finally the introduction of the buffer 24 is advantageous, in that the buffer serves to equalize quantity fluctuations of the control stream. Moreover, it serves to maintain the same average viscosity, so that with respect to reaction kinetics the admixing of this master batch dispersion with the main stream presents no problem. The conventional, technically expensive transformation of excess polyester into chips can be avoided by insertion of the buffer 24. Finally, the combination of the vacuum connections from precondensation and buffer permits a technically simple and inexpensive construction.

We claim:

1. In a method for the pigmentation of a linear fiber-forming polyester in a continuous polymerization process wherein a diol ester of a dicarboxylic acid or an oligomer thereof is condensed to form a precondensate stream and said precondensate stream is then further condensed to form a high polycondensate stream, the improvement which comprises branching off a partial stream of high polycondensate from said polycondensate stream, pigmenting said partial stream with a pigment in the presence of a glycol whereby glycolysis takes place to form a glycolized partial stream contains 2–40% pigment based glycolized partial stream with said precondensate stream; or, after first polycondensing said glycolized partial stream to form a polycondensed glycolized partial stream, combining and mixing the polycondensed glycolized partial stream with said high polycondensate stream.

2. A method according to claim 1 wherein said glycolized partial stream is combined and mixed with said precondensate stream.

3. A method according to claim 1 wherein said glycolized partial stream is polycondensed and then combined and mixed with said high polycondensate stream.

4. A method according to claim 1 wherein said partial stream constitutes 3 to 15% of said high polycondensate stream.

5. A method according to claim 1 wherein said glycolized partial stream contains 2–40% pigment based upon the weight of the glycolized partial stream.

6. A method according to claim 1 wherein said glycolized partial stream contains 3–10% pigment based upon the weight of the glycolized partial stream.

7. A method according to claim 1 wherein the polyester is an ester of a bifunctional organic carboxylic acid and a diol or an oligomer thereof.

8. A method according to claim 1 wherein the polyester is polyethylene terephthalate.

References Cited

UNITED STATES PATENTS 3,402,141 9/1968 Matthies et al. ________ 260—40

FOREIGN PATENTS 766,849 1/1957 Great Britain ________ 260—40
833,439 4/1960 Great Britain ________ 260—40
627,168 9/1961 Canada ______________ 260—40

MORRIS LIEBMAN, Primary Examiner

L. T. JACOBS, Assistant Examiner